United States Patent [19]

Ryan, Jr. et al.

[11] 4,252,406
[45] Feb. 24, 1981

[54] CONNECTOR FOR OPTICAL FIBERS

[75] Inventors: Edward A. Ryan, Jr., Long Branch; Robert H. Broadbelt, Manasquan, both of N.J.

[73] Assignee: The United States of America as represented by the Secretary of the Army, Washington, D.C.

[21] Appl. No.: 939,720

[22] Filed: Sep. 5, 1978

[51] Int. Cl.³ .............................................. G02B 5/14
[52] U.S. Cl. .................................................. 350/96.21
[58] Field of Search ................ 350/96.20, 96.21, 96.22

[56] References Cited
U.S. PATENT DOCUMENTS

| 3,922,064 | 11/1975 | Clark et al. | 350/96.22 |
| 3,923,371 | 12/1975 | Dalgleish | 350/96.21 |
| 3,948,582 | 4/1976 | Martin | 350/96.21 |
| 4,050,781 | 9/1977 | Beauhaire | 350/96.21 |
| 4,050,783 | 9/1977 | Tardy | 350/96.21 |
| 4,061,416 | 12/1977 | Stewart | 350/96.21 |
| 4,061,577 | 12/1977 | Bell | 350/96.21 X |
| 4,076,376 | 2/1978 | Slaughter | 350/96.21 |
| 4,105,285 | 9/1978 | Bedgood et al. | 350/96.21 |
| 4,148,554 | 4/1979 | Magnusson et al. | 350/96.21 |

FOREIGN PATENT DOCUMENTS 2529352   1/1976   Fed. Rep. of Germany ........ 350/96.21

*Primary Examiner*—Stewart J. Levy
*Attorney, Agent, or Firm*—Nathan Edelberg; Jeremiah G. Murray; Edward Goldberg

[57] ABSTRACT

A connector for connecting opposing ends of a pair of optical fibers including a movable, spring biased male contact secured to one end of a fiber and a fixed female contact secured to the opposing end of another optical fiber, the contacts having complementary configured mating surfaces, whereby the opposing ends of the optical fibers are accurately positioned and aligned.

9 Claims, 5 Drawing Figures

CONNECTOR FOR OPTICAL FIBERS

The invention described herein may be manufactured and used by or for the Government for governmental purposes without the payment of any royalties thereon or therefor.

BACKGROUND OF THE INVENTION

Various connectors have been proposed for placing and holding opposing ends of optical fibers in alignment. These connectors can be either of a permanent nature forming a splice between the optical fibers as disclosed in U.S. Pat. Nos. 3,919,037 to Miller; and 4,033,668 to Presby; or they can be of a mechanical nature providing a disconnectable butt connection as disclosed in U.S. Pat. Nos. 4,061,416 to Stewart; and 4,076,376 to Slaughter.

The connector of the present invention is the mechanical type whereby the fiber ends may be separated and subsequently restored to their aligned relationship. Since the diameter of an optical fiber is usually in the range of 10 to 500 microns, it is important that the connector be constructed and arranged to properly position and align the fiber ends. After considerable research and experimentation, the connector of the present invention has been devised which includes a movable, spring biased male contact secured to one end of a fiber and a fixed female contact secured to the opposing end of another optical fiber. The contacts are provided with complementary, configured mating surfaces, whereby the opposing ends of the optical fibers are accurately positioned and aligned when the contacts are interconnected.

DESCRIPTION OF THE PREFERRED EMBODIMENTS

Figure 1:
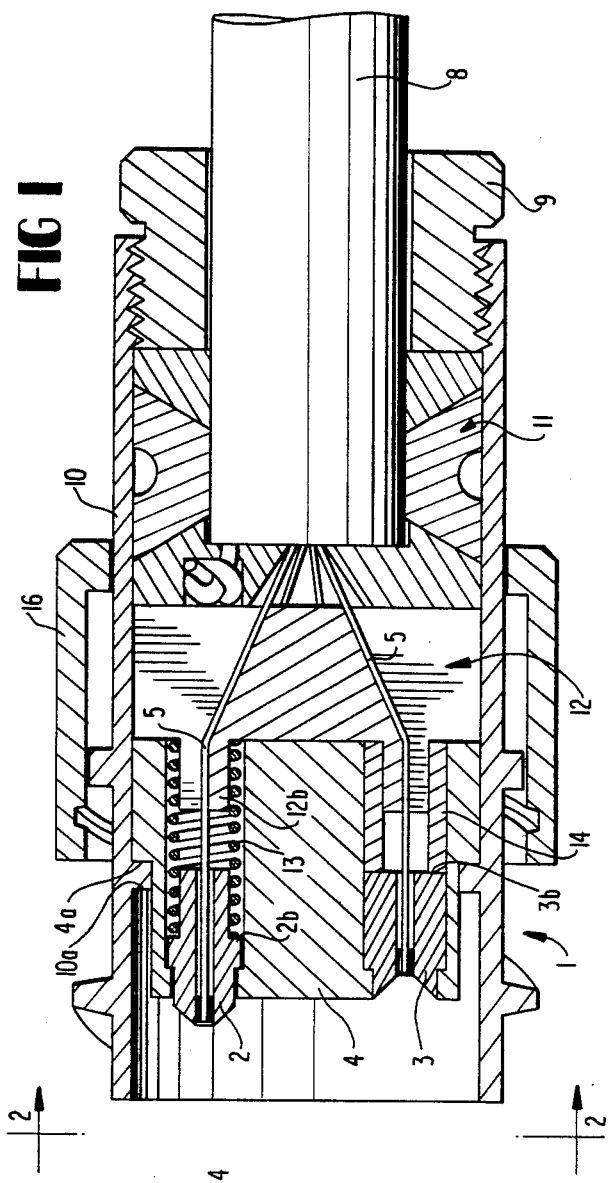
FIG. 1 is a sectional, side elevational view of a portion of the connector of the present invention.
Figure 2:
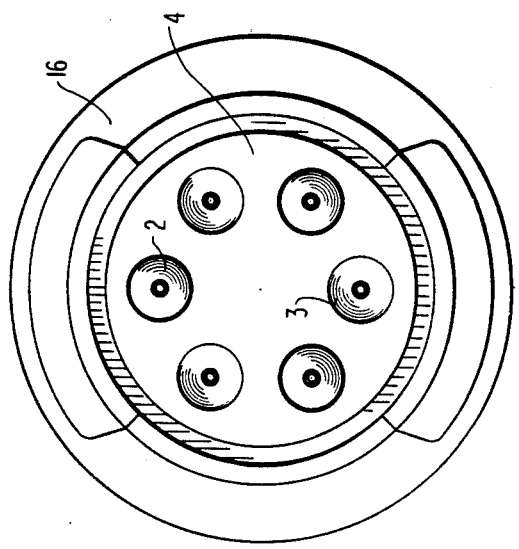
FIG. 2 is a view taken along line 2—2 of FIG. 1.
Figure 3:
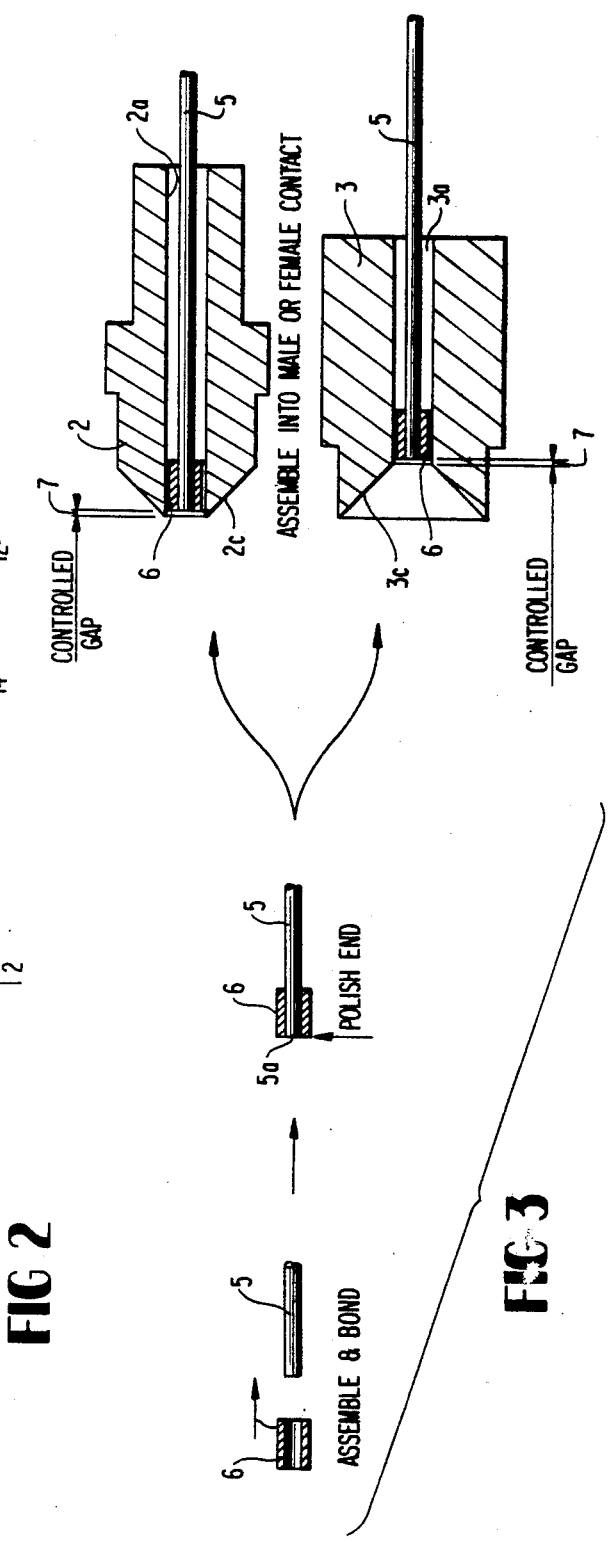
FIG. 3 is a view showing the steps of connecting the ends of the optical fibers to the male and female contacts employed in the connector of the present invention.

Referring to the drawings and more particularly to FIG. 1 thereof, the connector 1 of the present invention comprises a plurality of male contacts 2 and a plurality of female contacts 3 mounted within a housing 4. An end of an optical fiber 5 is connected to a respective contact, as will be seen in FIG. 3, wherein a sleeve 6 is bonded to the end portion of the fiber 5. The end 5a of the fiber is then polished to provide an optically distortion-free interface; and the fiber 5 and associated sleeve 6 are then inserted into axial bores 2a and 3a provided in the contacts 2 and 3. The polished interface 5a of each optical fiber is positioned within the respective bore 2a and 3a to form a controlled gap 7 between the end of the bore and the end of the fiber, whereby accurate minimal spacing is provided between mating optical fibers. After being so positioned, the sleeve 6 is secured to the respective contact by a suitable bonding agent.

While, for purposes of illustration, the connector of the present invention is shown for interconnecting the ends of a six fiber cable 8, it will be appreciated by those skilled in the art that the connector can be employed for interconnecting any number of fibers depending upon the type of cable employed.

Figure 5:
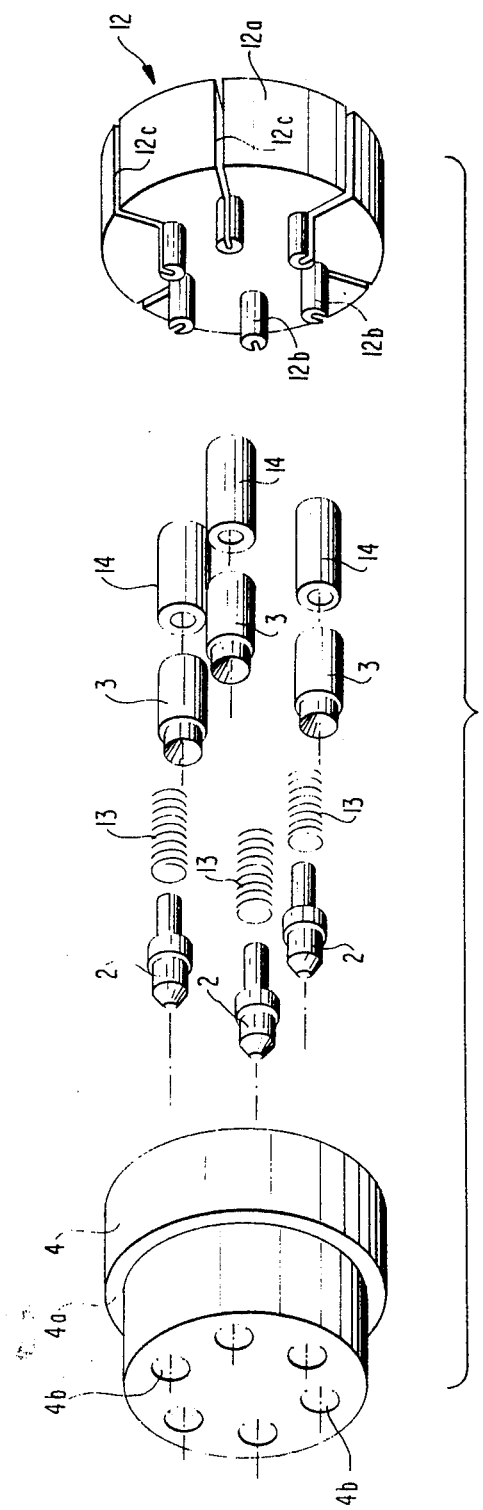
FIG. 5 is a perspective, exploded view showing the housing for the contacts and the fiber guide.

The details of the construction of the connector are shown in FIGS. 1 and 5 wherein it will be seen that the end of the cable 8 is inserted through a grommet 9 threaded on the end of a cylindrical sleeve 10. A conventional seal 11 is provided between the end of the grommet 11 and a face or end wall of a fiber guide 12. The fiber guide consists of a cylindrical block 12a having axially extending pins 12b integrally connected to the opposite face of the block and positioned radially inwardly from the peripheral surface thereof. A plurality of radially extending slots 12c are provided in the block and pins, each slot being adapted to receive a respective fiber 5 from the cable 8.

Figure 4:
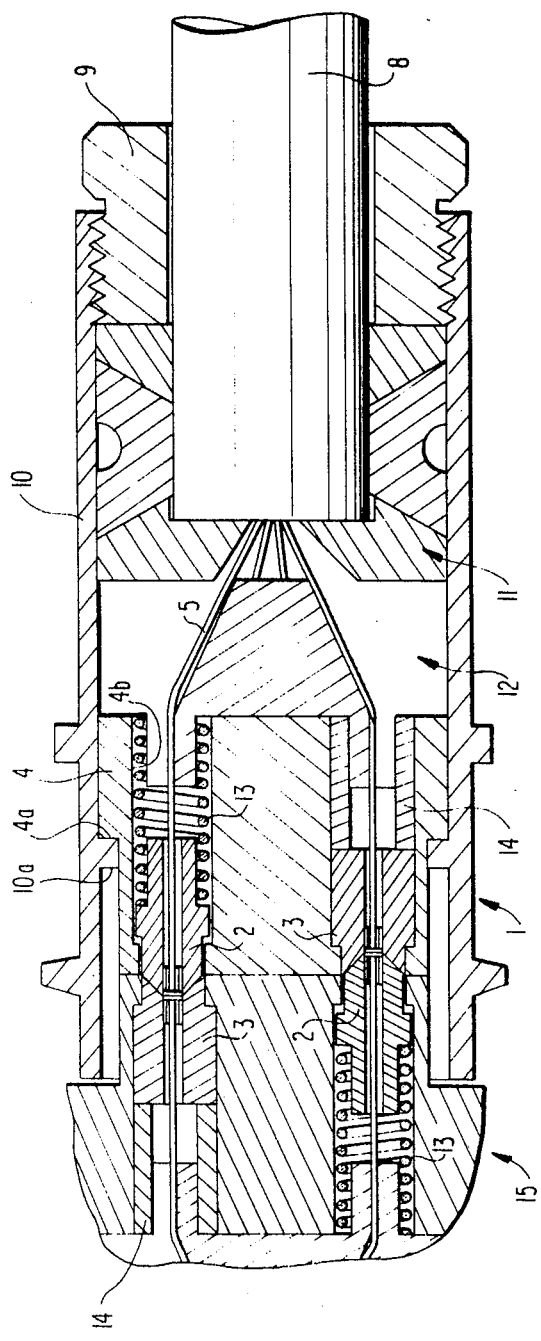
FIG. 4 is a fragmentary, sectional side elevational view of the connector showing the fiber ends being aligned.

The housing 4, in which the contacts 2 and 3 are mounted, includes a cylindrical wall having a shoulder 4a engaging a radially, inwardly extending flange 10a on the sleeve 10, the inner end of the housing abutting the face of the cable guide 12, whereby the housing is fixedly mounted within the sleeve 10. The housing 4 is provided with a plurality of axially extending bores 4b for receiving the contacts 2 and 3. Each male contact 2 is slidably mounted within its respective bore and is biased in an axial direction outwardly of the housing by a compression spring 13 mounted between a shoulder 2b on the contact 2 and the face of the cable guide 12. Each female contact 3 is fixedly mounted within its respective bore and held therein by a tubular member 14 mounted on the pins 12b, the ends of the tubular member 14 abutting the inner face 3b of the contact and the face of the cable guide. Each male contact is provided with a conical nose portion 2c which is adapted to be received within a complementary configured conical recess 3c formed in the nose portion of a female contact 3 mounted in a mating connector 15 as shown in FIG. 4. When coupling the connectors 1 and 15, each floating male contact 2 is forced to align with a respective fixed female contact 3, and the spring 13 is compressed providing a biasing force holding the contacts 2 and 3 in a stable, controlled, mated position. When the contacts 2 and 3 are fully mated, the connecting ends 5a of the optical fibers 5 are located accurately in the concentric center of the mating contacts 2 and 3 and are therefore aligned, and the interfaces 5a of the optical fibers are separated by a controlled minimal space provided by the gaps 7 so that the polished interfaces of the fibers do not become scratched.

It will be appreciated by those skilled in the art that the connectors 1 and 15 are held in the coupled position as shown in FIG. 4 by means of a collar 16 (FIG. 1) rotatably mounted on sleeve 10 which is adapted to engage a flange on the corresponding sleeve of the opposite connector to thereby provide a quick-disconnect connection between the connectors 1 and 15.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A connector for optical fibers comprising, a cylindrical male contact having an integral end projection of constant dimensions positioned at one end of a first optical fiber and including an axial bore to receive said first fiber end, a cylindrical female contact positioned at the opposing end of a second optical fiber and including a recess to receive said projection and an axial bore to receive said second fiber end, a pair of like intermediate sleeves respectively positioned within the respective bore of each contact around the end of each fiber and fixedly securing each said contact to each said fiber end, said male and female contacts having complementary configured mating surfaces in the area surrounding the opposing ends, said ends of each fiber and the respective intermediate sleeve ends being coextensive and spaced inwardly from the end of each bore in each respective contact, whereby the opposing ends of the optical fibers are accurately positioned adjacent one another at a fixed spacing and aligned when the contacts are interconnected with said projection engaging said recess.

2. A connector for optical fibers according to claim 1, wherein said sleeve is bonded to and between said fiber end and contact bore.

3. A connector for optical fibers according to claim 2, wherein the ends of the mating optical fibers are polished to provide an optically distortion free interface at said fixed spacing.

4. A connector for optical fibers according to claim 1, wherein said complementary, configured mating surfaces comprise a conical surface on the male contact, and a conical recess on the female contact.

5. A connector for optical fibers according to claim 1, wherein the contacts are mounted within a housing, said housing having a plurality of axially extending bores, said male contact being slidably mounted in one of said bores, and said female contact being fixedly mounted in another of said bores.

6. A connector for optical fibers according to claim 5, wherein a compression spring is mounted within the bore containing the male contact, whereby the male contact is biased in an axial direction outwardly of the housing.

7. A connector for optical fibers according to claim 6, wherein an optical fiber guide is positioned adjacent an end of said housing for guiding the optical fibers from a fiber bundle to their respective bores in said housing, said guide comprising, a cylindrical block, a plurality of axially extending pins provided on one face of said block and positioned radially inwardly from the peripheral surface thereof, said pins extending into the bores in said housing, a plurality of radially extending slots formed in said block and pins, each slot being adapted to receive a respective fiber from said bundle.

8. A connector for optical fibers according to claim 7, wherein the compression spring is mounted coaxially on a respective fiber guide pin and is biased between said one face of the fiber guide and a shoulder on the male contact, each pin extending into the housing bore containing the female contact having a tubular member mounted coaxially thereon, one end of said tubular member abutting the female contact, and the opposite end of the tubular member abutting said one face of said guide whereby the female contact is fixedly mounted within said housing.

9. A connector for optical fibers according to claim 8, wherein said housing containing said contacts, and said optical fiber guide are mounted within a sleeve, a collar rotatably mounted on said sleeve for cooperating with another sleeve having another contact housing and a fiber guide, to thereby provide a quick disconnect coupling between the sleeves.

* * * * *